United States Patent [19]
Rubin et al.

[11] 3,943,969
[45] Mar. 16, 1976

[54] POSITIVE ACTING CHECK VALVE OF POLYVINYLCHLORIDE TO OPEN IN RESPONSE TO PREDETERMINED LINE PRESSURE

[76] Inventors: Albert Rubin, 2051 Bahama Drive, Miramar; Benjamin H. Travis, 3901 SW. 59 Ave., West Hollywood, both of Fla. 33023

[22] Filed: Apr. 25, 1975

[21] Appl. No.: 571,681

[52] U.S. Cl. ............ 137/538; 137/540; 137/543.23; 251/368
[51] Int. Cl.² .......................................... F16K 15/02
[58] Field of Search ............... 137/538, 540, 543.23; 251/148, 368

[56] References Cited
UNITED STATES PATENTS

| | | | |
|---|---|---|---|
| 2,206,356 | 7/1940 | Hutchings | 137/538 X |
| 2,538,364 | 1/1951 | James et al. | 137/540 X |
| 2,650,793 | 9/1953 | Clark, Jr. et al. | 137/543.23 |
| 2,679,858 | 6/1954 | Kemp | 137/543.23 X |
| 3,072,143 | 1/1963 | Fleischhacker | 137/543.23 X |
| 3,550,902 | 12/1970 | Pidgeon | 251/368 X |
| 3,756,273 | 9/1973 | Hengesbach | 137/540 |
| 3,770,009 | 11/1973 | Miller | 251/368 X |

*Primary Examiner*—William R. Cline

[57] ABSTRACT

A valve, the housing and gate of which are composed of molded rigid polyvinylchloride, the valve body having an interior chamber with a main upstream inlet and a main downstream outlet and an annular valve seat in the housing, and a gate being arranged in the housing which is spring-biased to a normally closed position with an O-ring in sealing relation on the seat to effectively block fluid flow through the valve and said spring being selected so as to have a resiliency to yield in response to predetermined upstream fluid pressure to unseat the valve member and permit flow of fluid through the valve so long as the predetermined pressure is exceeded.

4 Claims, 2 Drawing Figures

POSITIVE ACTING CHECK VALVE OF POLYVINYLCHLORIDE TO OPEN IN RESPONSE TO PREDETERMINED LINE PRESSURE

FIELD OF THE INVENTION

This invention relates to a valve and, more particularly, to a positive acting check valve of polyvinylchloride which includes spring means normally urging the valve to a positive acting check valve of polyvinylchloride which includes spring means normally urging the valve to a closed position and adapted to open in response to a predetermined upstream line pressure.

BACKGROUND OF THE INVENTION

In the past numerous efforts have been made to design a positive acting one-way check valve of polyvinylchloride material which is suitable for use in irrigation projects and which is simple and inexpensive to manufacture and which is adapted to open only when there is sufficient upstream fluid pressure in the line. This invention is of such a valve.

OBJECTS OF THE INVENTION

It is, accordingly, an object of this invention to provide a positive acting check valve the principal components parts of which are of rigid molded polyvinylchloride material and which includes the structure such that the valve is adapted to open in response to a predetermined upstream pressure which overcomes spring means included in the valve structure and which includes guide means for smooth action of the valve and means for readily connecting the same to the ends of standard length piping material.

In accordance with these and other objects which will become apparent hereinafter the instant invention will now be described with reference to the accompanying drawings in which:

DESCRIPTION OF DRAWINGS OF A PREFERRED EMBODIMENT

FIG. 1 is a vertical cross sectional view of the valve of the present invention in a closed condition; and FIG. 2 is a vertical cross sectional view similar to FIG. 1 with the valve in an open condition.

DESCRIPTION OF PREFERRED EMBODIMENT

Figure 1:
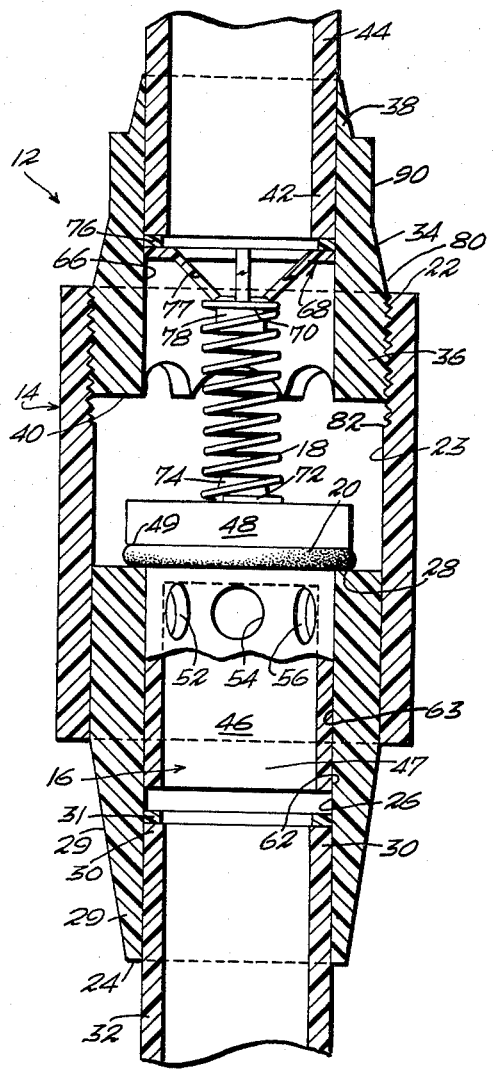

Referring to the drawings wherein like reference characters designate like or corresponding parts throughout the several views, the numeral 12 generally designates the valve which, in general, is composed of a valve body 14 and an internally captivated axially movable valve member or gate 16. Both the body and gate are of rigid molded polyvinylchloride. The valve also includes a spring 18 arranged in the body to normally close the gate by urging an O-ring 20 carried on the valve member into sealing engagement with a valve seat 28 in the body.

Referring more in detail to the body, it comprises a generally tubular member having a first or downstream end 22 with an axial bore 23 of a first diameter extending axially toward the opposite second upstream end 24 which also has an axial bore 26, which is of a second diameter that is less than the first diameter and which latter extends to the first bore defining the shoulder or valve seat 28 at the juncture of the bores. Preferably, the body about the second bore defines an externally tapered skirt 29 the interior of which is sized to receive the end 30 of a standard size diameter pipe 32 and may be internally threaded, be slightly tapered, or otherwise be adapted for fluid tight connection with the pipe end. The skirt may comprise a separate piece or be integral with the body as shown and includes means limiting the amount of axial length of the pipe which may be inserted. These means may comprise a blocking washer 31 secured in the skirt by suitable means.

In the first or downstream bore 23 a fitting 34 of molded rigid polyvinylchloride is provided which fitting has an axial through passageway and is composed of a generally tubular proximal or upstream portion 36 and a preferably tapered distal or downstream portion 38. The cylindrical portion is preferably sized to threadably mate with threads on the interior of the bore 23, as shown, or it may be sized to provide a snug fit in the bore. The proximal end 40 of the cylindrical wall portion comprises stop means to limit axial movement of the gate in the downstream direction, as will be more fully apparent hereinafter. The extending distal portion 38 is adapted to connect to the end 42 of a standard size diameter pipe 44 in a suitable manner as described above with respect to the pipe end 30.

Referring now to the gate or valve member, it includes a hollow cylindrical portion 46 with a closed headed downstream end 48, there being an exterior annular shoulder 49 defined between the tublar portion 46 and the headed end 48. The O-ring 20 is positioned exteriorly on the cylindrical portion 46 in abutting relation to the adjacent surface 50 of the shoulder 49 of the closed headed end 48. An annular groove may be provided in the surface of the tubular portion as positioning means for the O-ring to nest the inside circumferential surface of the O-ring in the desired location. Passageways through the wall of the cylindrical portion 46 are provided which communicate with the interior or column 47 of the cylindrical portion of the valve member, the passageways being arranged in a circumferential path and comprising a ring of radial openings 52, 54 and 56. The cylindrical portion is sized for axial movement in the second bore to permit axial movement of the closed headed end in the first bore 23 between the stop means 40 and the shoulder or valve seat 28, the headed end being of a diameter which is greater than that of the second bore 26 but substantially less than that of the first bore. The axial distance between the effective plane of the stop means 40 and the shoulder 28 is at least as great as the axial distance between the ring of openings 52, 54, and 56 in the gate or valve member 16 and the adjacent surface 50 of the headed end and O-ring to permit full opening of the ring openings. Further, the smallest cross sectional area of the space between the headed portion of the gate and the wall 51 of the bore 23 and, also, the cross sectional area of the sum of the openings in the ring is greater than the cross sectional area of the inside of the standard size pipe to be used with the valve, so as not to unduly impede fluid flow through the valve.

Figure 2:
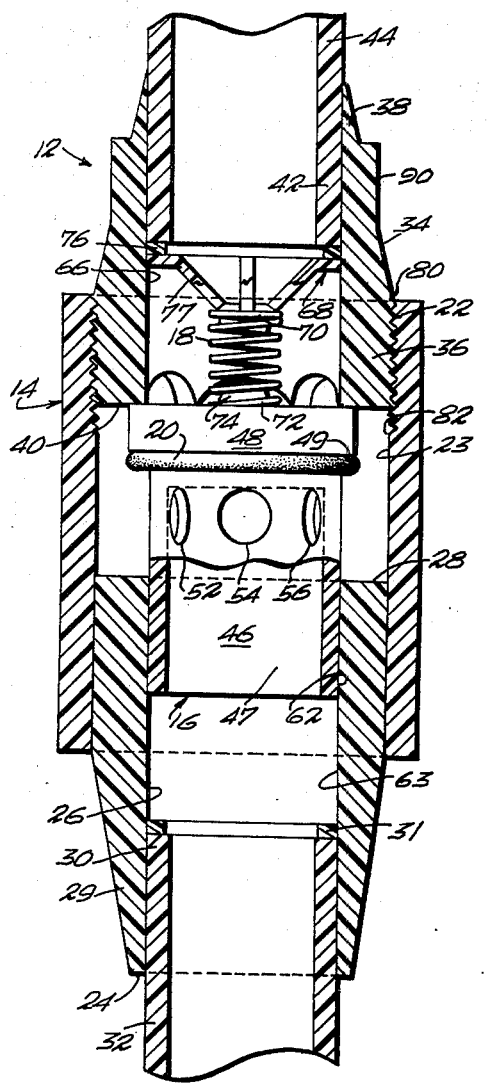

It is thus seen that water or other liquid may enter the upstream side 24 of the valve and exert fluid pressure on the inside of the closed headed end to lift the gate from sealing relation with the seat 28 so the liquid can flow through the interior column of the cylindrical portion of the gate, through the radial openings and into the bore 23 passing about the headed end 48 to an exit through the axial passageway of the fitting 34 which passageway will be described hereinafter but which is of a cross sectional area greater than that of the interior of the pipe to which the valve is connected. The spring means 18 are provided to normally urge the valve gate into the position shown in FIG. 1, i.e., in sealing relation with the valve. It is yieldable to the position shown in FIG. 2, when the fluid pressure upstream is sufficient to overcome the forces urging the valve into the closed position of FIG. 1. To this end a calibrated spring may be selected to provide the force that is desired to be overcome and, when it has been overcome, the valve will open.

Guide means are provided for the valve gate as will now be explained. The length of the exterior surface 62 of the tubular portion of the gate is of smooth uniform cross section and of substantial axial length between the ring of openings and the upstream end which is at least greater than the aforesaid distance between the stop means 40 and the valve seat 28, and preferably at least three times that distance. This is so that at all times the cylindrical portion is in substantial guided sliding engagement with the smooth internal surface 63 of the bore 26 of the valve body. The sliding coaction acts as guide means for the valve gate, the diameter of the tubular portion being substantially the same as and companionately sized with respect to the inside diameter of the bore 26 but slightly foreshortened to permit smooth sliding guided axial movement for the gate under the influence of fluid pressure and spring action.

Referring to the fitting 34 it is preferably provided with an axial through bore 66 spanned internally by an internal radial open work 68, which captivates the downstream end 70 of the spring 18 holding it between it and the headed downstream portion of the gate end. The other or upstream end 72 of the spring is connected to positioning means 74 on the exterior of the headed valve end. In a preferred embodiment, the openwork 68 may include an annular washer 76 fixed in the bore 66 by cement or by other suitable means and a removable upstream grid 77 in the aforesaid bore 66. The grid may include an axially internally projecting pin 78 to engage the spring or be arranged in other suitable means to captivate the spring end.

In use to set a predetermined fluid pressure at which the valve will open, the fitting 34 is removed, a spring is selected, which is calibrated to provide a seating force on the gate so it will not open until the spring force is exceeded. The spring is inserted; and, after the spring has been inserted, it is captivated by replacing the fitting. The fitting is threadably advanced until the end of the tapered surface 80 of the fitting is at the plane of the downstream end 22 of the valve body. Thereafter, minor adjustment of the spring compression or force may be made by threadably retracting or advancing the fitting to the limit means composed of the end of the threads as at 82. On the exterior of the tapered portion of the fitting 34 a turning nut surface 90 is provided for this latter adjustment.

It is thus seen that an adjustable and inexpensive positive action valve has been provided which is composed primarily of molded polyvinylchloride parts and that the valve may be oriented in any desired position for installation and may be quickly inserted as a check valve in a fluid distribution line such as in an irrigation system.

What is claimed is:

1. A normally closed spring-biased valve comprising:
   A. a valve housing of rigid polyvinylchloride which includes a body with an axial through passageway defined by a first downstream bore of a first diameter and a second upstream bore of a second diameter, said bores being opposed and aligned and in fluid communication with one another, said first bore being of a larger diameter than said second bore forming a valve seat shoulder in said body at the juncture of said bores;
   B. an axially movable valve member of rigid polyvinylchloride in the body comprising:
      a. a hollow cylindrical portion in said second bore with an open upstream end and a uniform cross section sized for axial movement in said second bore, and
      b. a closed headed downstream portion of a cross sectional area less than that of the first bore and greater than that of the second bore and effective to mechanically limit axial upstream movement of said cylindrical portion in said second bore,
      c. said cylindrical portion having a plurality of radial openings arranged in a circumferential path which is axially spaced from said headed end a first axial distance to permit fluid flow from the interior of the hollow cylindrical portion downstream into the first bore when the openings are in the first bore;
   C. stop means having an axially facing through passageway in said first bore, said stop means being axially from said valve seat shoulder a second axial distance which is greater than said first distance to mechanically limit downstream axial movement of the valve member, so that the radial openings are in fluid communication with the first bore when the valve member is in engagement with said stop means;
   D. an O-ring circumposed about said cylindrical portion and in abutting relation with said headed portion, said O-ring being sized to seal against fluid flow between said first bore and said second bore when said O-ring is captivated between said headed portion and said valve seat shoulder;
   E. compression spring means including means captivating said spring means between said stop means and said headed portion, said spring means being effective to normally urge said O-ring into sealing engagement with said headed portion and said valve seat shoulder and effective to yieldingly permit said valve member to move axially downstream in response to a predetermined upstream fluid pressure in said second bore to permit fluid flow through the hollow cylindrical portion, said radial openings, said axial through openings and said first bore;
   F. said second bore being sized to receive the ends of a standard companionate size diameter pipe to be connected in axial alignment with the valve;
   G. first means in the second bore to limit axial insertion of the pipe end;
   H. said cylindrical portion being of an axial length substantially greater than said second axial distance and the axial length of said second bore, between said means limiting axial insertion and said valve seat shoulder, being at least equal to the axial length of said cylindrical portion;
   I. guide means constraining said valve member to axial movement of translation only and comprising said cylindrical portion being of uniform cross section between said seat and upstream valve member end and sized for sliding engagement in said second bore and having an axial length such that, at all times, a substantial axial length of said cylindrical portion is in said second bore;

J. said stop means comprising an end member of rigid polyvinylchloride secured in said first bore and said end member including an axially downstream facing socket in axial alignment with said axially facing through passageway, said socket being sized to receive the end of a standard companionately sized diameter pipe to be connected in axial alignment with the valve; and K. second means in said socket to limit axial insertion of an end of a standard size pipe to be connected to the valve.

2. The improvement as set forth in claim 1 wherein said end member is threadably engaged in mating threads in said first bore to increase or decrease the compression of said spring means to vary the pressure required in said second bore to permit fluid flow through said valve.

3. The device as set forth in claim 2 wherein operator means are exteriorly carried on said end member to threadably advance or retract said end member in said first bore.

4. The device as set forth in claim 1 wherein said end member includes an axially upstream facing portion and said headed portion includes an axially downstream facing portion engaging said spring means and comprising said means to captivate said spring means.

\* \* \* \* \*